(12) United States Patent
Marcos et al.

(10) Patent No.: US 12,122,132 B2
(45) Date of Patent: Oct. 22, 2024

(54) SKIN FOR DRESSING BACKLIT VEHICLE INTERIOR PARTS, METHOD AND INSTALLATION FOR MANUFACTURING THEREOF

(71) Applicant: GRUPO ANTOLÍN-INGENIERÍA, S. A., Burgos (ES)

(72) Inventors: César Marcos, Burgos (ES); Alberto Albillos, Burgos (ES); Ricardo Iglesias, Burgos (ES)

(73) Assignee: GRUPO ANTOLÍN-INGENIERÍA, S. A., Burgos (ES)

( * ) Notice: Subject to any disclaimer, the term of this patent is extended or adjusted under 35 U.S.C. 154(b) by 226 days.

(21) Appl. No.: 17/893,726

(22) Filed: Aug. 23, 2022

(65) Prior Publication Data
US 2023/0063840 A1 Mar. 2, 2023

(30) Foreign Application Priority Data
Aug. 24, 2021 (EP) .................................. 21382779.3

(51) Int. Cl.
*B32B 3/24* (2006.01)
*B05C 5/02* (2006.01)
(Continued)

(52) U.S. Cl.
CPC .............. *B32B 3/266* (2013.01); *B32B 7/12* (2013.01); *B32B 37/08* (2013.01); *B32B 37/1207* (2013.01); *B32B 38/06* (2013.01); *B60Q 3/60* (2017.02); *B60R 13/02* (2013.01); *B05C 5/001* (2013.01); *B05C 5/0254* (2013.01); *B05C 11/023* (2013.01); *B29C 35/16* (2013.01); *B29C 2043/3433* (2013.01); *B29C 48/155* (2019.02); *B29C 48/266* (2019.02); *B29C 48/3001* (2019.02); *B29L 2031/3005* (2013.01); *B29L 2031/747* (2013.01); *B32B 3/30* (2013.01);
(Continued)

(58) Field of Classification Search
None
See application file for complete search history.

(56) References Cited

U.S. PATENT DOCUMENTS

| | | | | |
|---|---|---|---|---|
| 799,367 A | * | 9/1905 | Angier | B32B 15/08 428/457 |
| 2,837,455 A | * | 6/1958 | Wolf | B29C 44/329 427/244 |

(Continued)

FOREIGN PATENT DOCUMENTS

| | | | | |
|---|---|---|---|---|
| DE | 102008041701 A1 | * | 3/2010 | ............ B32B 21/08 |
| DE | 102008043441 A1 | * | 5/2010 | ............ B32B 1/08 |

(Continued)

*Primary Examiner* — Jeffrey A Vonch
(74) *Attorney, Agent, or Firm* — Darrell G. Mottley (57) ABSTRACT

Skin for dressing backlit vehicle interior parts comprising a perforated opaque decorative layer and a light transmitting material filling the holes wherein the light transmitting material is a reactive hotmelt adhesive which forms a base layer extended over the back side of the opaque decorative layer and comprising a central portion and a transition portion surrounding the central portion and several projections protruding from the central portion of the base layer and completely filling the through holes. Method and an installation for manufacturing said skin for dressing backlit vehicle interior parts.

20 Claims, 4 Drawing Sheets

(51) Int. Cl.

| | |
|---|---|
| *B05C 11/02* | (2006.01) |
| *B29C 43/34* | (2006.01) |
| *B29C 48/155* | (2019.01) |
| *B29C 48/25* | (2019.01) |
| *B29C 48/30* | (2019.01) |
| *B32B 3/26* | (2006.01) |
| *B32B 7/12* | (2006.01) |
| *B32B 37/08* | (2006.01) |
| *B32B 37/12* | (2006.01) |
| *B32B 38/06* | (2006.01) |
| *B60Q 3/54* | (2017.01) |
| *B60Q 3/60* | (2017.01) |
| *B60R 13/02* | (2006.01) |
| *B05C 5/00* | (2006.01) |
| *B29C 35/16* | (2006.01) |
| *B29L 31/00* | (2006.01) |
| *B29L 31/30* | (2006.01) |
| *B32B 3/30* | (2006.01) |
| *B60Q 3/14* | (2017.01) |
| *F21V 11/08* | (2006.01) |

(52) U.S. Cl.
CPC . *B32B 2037/1215* (2013.01); *B32B 2307/402* (2013.01); *B32B 2307/408* (2013.01); *B32B 2307/41* (2013.01); *B32B 2307/412* (2013.01); *B32B 2307/414* (2013.01); *B32B 2309/02* (2013.01); *B32B 2309/12* (2013.01); *B32B 2605/003* (2013.01); *B60Q 3/14* (2017.02); *B60Q 3/54* (2017.02); *F21V 11/08* (2013.01); *Y10T 428/24331* (2015.01); *Y10T 428/24339* (2015.01)

(56) References Cited

U.S. PATENT DOCUMENTS

| | | | | |
|---|---|---|---|---|
| 6,652,128 | B2* | 11/2003 | Misaras | G02B 6/0008 |
| | | | | 362/85 |
| 10,590,600 | B1* | 3/2020 | Wang | H01H 13/023 |
| 10,637,977 | B1* | 4/2020 | Wang | H04M 1/0249 |
| 2007/0278703 | A1* | 12/2007 | Hardy | B29C 66/472 |
| | | | | 257/276 |
| 2007/0291496 | A1* | 12/2007 | Nashner | B29D 11/00663 |
| | | | | 264/1.24 |
| 2009/0040790 | A1* | 2/2009 | Payne | G06F 1/1616 |
| | | | | 362/632 |
| 2009/0264580 | A1* | 10/2009 | Abba | A61L 15/585 |
| | | | | 524/505 |
| 2010/0044092 | A1* | 2/2010 | Simenson | B29D 11/00663 |
| | | | | 174/262 |
| 2010/0263235 | A1* | 10/2010 | Schaefer | C14C 11/006 |
| | | | | 69/21 |
| 2011/0236645 | A1* | 9/2011 | Osako | H05K 5/02 |
| | | | | 427/553 |
| 2012/0237725 | A1* | 9/2012 | Stossel | B60R 13/04 |
| | | | | 156/221 |
| 2013/0301287 | A1* | 11/2013 | Schlemmer | B60Q 3/54 |
| | | | | 362/509 |
| 2014/0119038 | A1* | 5/2014 | Mulder | H01L 21/76224 |
| | | | | 362/311.03 |
| 2016/0321965 | A1* | 11/2016 | Phuklin Prichystal | |
| | | | | C25D 11/246 |
| 2018/0093609 | A1* | 4/2018 | Kautz | B60Q 3/54 |
| 2019/0283667 | A1* | 9/2019 | Eitel | B60Q 3/64 |
| 2020/0139595 | A1* | 5/2020 | Kim | B32B 5/02 |
| 2020/0164795 | A1* | 5/2020 | DeGrote | B60K 37/20 |
| 2021/0071847 | A1* | 3/2021 | Ito | B32B 3/266 |
| 2021/0229599 | A1* | 7/2021 | DeGrote | B60Q 3/54 |
| 2021/0291754 | A1* | 9/2021 | Topp | G02B 6/0051 |
| 2021/0309106 | A1* | 10/2021 | Bachmeier | B60Q 3/14 |
| 2022/0227292 | A1* | 7/2022 | Basquin | B60Q 3/54 |
| 2022/0258392 | A1* | 8/2022 | Weih | B29C 45/14795 |
| 2023/0001850 | A1* | 1/2023 | Yoon | B60Q 3/54 |
| 2023/0273364 | A1* | 8/2023 | Dillinger | B60Q 3/233 |
| | | | | 362/511 |

FOREIGN PATENT DOCUMENTS

| | | | | |
|---|---|---|---|---|
| DE | 102009024989 A1 | * | 12/2010 | B60Q 3/54 |
| DE | 102011082343 A1 | * | 3/2013 | B60Q 3/54 |
| DE | 102011082344 A1 | * | 3/2013 | B60Q 3/54 |
| DE | 202012100538 U1 | * | 4/2013 | B32B 1/00 |
| DE | 202012104088 U1 | * | 4/2013 | B29C 59/16 |
| DE | 102012002650 A1 | * | 8/2013 | B44C 3/10 |
| DE | 102012110153 A1 | * | 8/2013 | B32B 1/00 |
| DE | 102013202223 A1 | * | 8/2014 | B32B 27/065 |
| DE | 102013012201 A1 | * | 1/2015 | B32B 27/12 |
| DE | 102016206419 A1 | * | 10/2017 | |
| DE | 102016214806 A1 | * | 2/2018 | B60Q 3/20 |
| DE | 202017104082 U1 | * | 8/2018 | |
| DE | 102017216130 A1 | * | 3/2019 | |
| DE | 202018101500 U1 | * | 4/2019 | B32B 27/08 |
| DE | 102018106259 A1 | * | 9/2019 | B29C 45/14221 |
| DE | 102019104205 A1 | * | 9/2019 | B32B 27/08 |
| DE | 102018207296 A1 | * | 11/2019 | |
| DE | 102018124893 A1 | * | 4/2020 | |
| DE | 102018130738 A1 | * | 6/2020 | |
| DE | 102019107019 A1 | * | 9/2020 | B05D 1/265 |
| DE | 102019121917 A1 | * | 2/2021 | B60K 37/02 |
| DE | 102019211228 A1 | * | 2/2021 | |
| DE | 102019125832 A1 | * | 3/2021 | |
| DE | 102020113705 A1 | * | 11/2021 | |
| DE | 202020106722 U1 | * | 1/2022 | |
| EP | 1344687 A2 | * | 9/2003 | B29C 45/14688 |
| EP | 1500487 A1 | * | 1/2005 | B22D 17/00 |
| EP | 2060443 A2 | * | 5/2009 | B60Q 3/14 |
| FR | 2936588 A1 | * | 4/2010 | B60Q 3/004 |
| WO | WO-2016024029 A1 | * | 2/2016 | B44C 1/24 |
| WO | WO-2019234023 A1 | * | 12/2019 | B29C 43/361 |
| WO | WO-2023281064 A1 | * | 1/2023 | B29C 45/0001 |
| WO | WO-2023281065 A1 | * | 1/2023 | B60Q 3/54 |

\* cited by examiner

SKIN FOR DRESSING BACKLIT VEHICLE INTERIOR PARTS, METHOD AND INSTALLATION FOR MANUFACTURING THEREOF

CROSS-REFERENCE TO RELATED APPLICATIONS

This application claiming priority to EP21382779, filed Aug. 24, 2021, the contents of which are incorporated herein by reference in its entirety.

FIELD

The present invention relates to a skin for dressing backlit vehicle interior parts. Particularly the skin comprises a perforated opaque decorative layer and a light transmitting material filling the holes wherein the skin is configured to light can pass through said holes filled with the light transmitting material.

In addition, the invention relates to a method and an installation for manufacturing said skin for dressing backlit vehicle interior parts.

BACKGROUND

It is increasingly common to find ambient or decorative lighting and functional lighting inside the vehicles in order to improve the occupant's comfort.

Given the importance to keep a good external appearance inside the vehicle, the lighting devices are usually integrated in the vehicle interior parts in such a way that they are hidden at the back side of them.

This means that the visual appearance of the vehicle interior parts does not change due to the fact that they incorporate a lighting device when they are seen from the vehicle cabin, unless the lighting device is switched on. These vehicle interior parts are usually called backlit vehicle interior parts.

Due to the fact that the lighting devices are hidden at the back side, every part being in front of the lighting device, namely the carrier that forms the structural part of the vehicle interior part and the skin that forms the external decorative layer, has to be translucent in order to the light can pass through them from the back side of the vehicle interior part to the front side thereof in order to illuminate the vehicle cabin.

Regarding the skin, it can comprise a translucent layer as such, for example translucent films, thin veneers or textiles; or an opaque layer such as leather or synthetic leather.

In the case of using opaque layers, they need to be perforated in order to the light can pass through them.

Due to the fact the skin is an external decorative layer exposed to the vehicle environment conditions, there is a risk that the holes are clogged by dust or other materials, hampering or blocking the light passage through said holes.

In order to overcome said problem, it is known filling the holes with a light transmitting material. Some examples are the patent documents DE102008043441B4, DE102016214806A1 or DE102019121917A1.

However, filling the holes with a light transmitting material entails some challenges to take into account, namely keeping a good finishing of both the skin and interior vehicle part dressed with said skin, and controlling the quality of the light passing through the light transmitting filler.

Particularly regarding the finishing quality, it has to be taken into consideration that the light transmitting filler is perfectly flush with the front side of the skin in order to the front side has a continuous visual an haptic appearance.

It is also important in order to ensure the finishing quality that during the filler application process the front side of skin does not get dirty due to filler leakages and said skin does not suffer damages due to the high temperature of the filler during its application.

Regarding the lighting quality, it has to be taken into consideration that the light transmitting filler completely and homogeneously fills the holes avoiding voids or bubbles affecting an efficient use of the light. It is also important that the light transmitting filler is perfectly flush with the front side of the skin meaning a clean light exit which directly affects to an efficient distribution of the light.

Both lighting quality and finishing quality are specially critical at the outmost surface of the light transmitting filler, the light exit part, where the light exits.

In addition, lighting quality and finishing quality have to remain during the service life of the skin. It means that the light transmitting filler should maintain its chemical and physical stability during its service life.

A known solution solving the above challenges is disclosed in the patent document DE102019107019A1.

It discloses a method for manufacturing a skin comprising a perforated opaque layer and a light transmitting filler filling the holes to prevent the hole blockage due to dust or other unexpected materials.

The method comprises filling the holes with a reactive hotmelt adhesive having a low viscosity when it is applied in order to ensure a complete and homogeneous filling.

A low enough viscosity of the light transmitting filler implies that the filler overflows during the filler application step. It means that the skin gets dirty and the filler is not flush with the front side of the skin.

In order to overcome said problem, DE102019107019A1 discloses a method wherein a protective sheet is firmly connected to the front side of the skin before applying the light transmitting filler, and once said light transmitting filler is cured said protective sheet is removed.

It implies some drawbacks such as extending the cycle time due to the addition of extra steps to the method or due to the fact it is necessary to wait for the light transmitting filler cures before removing the protective sheet, the risk of damaging the skin during the removal step and the use of an extra part.

In addition, although DE102019107019A1 tackles the challenge of achieving a complete and homogeneous filling of the holes by using a light transmitting filler having a low viscosity, it is silent about which is the viscosity balance in order to keep a complete and homogeneous filling and to avoid filler leakages at the front side of the skin.

On the other hand, as DE102019107019A1 discloses it is necessary to create an excess of light transmitting filler layer at the back side of the skin in order to ensure a complete filling of the holes.

For the sake of cost efficiency, the light transmitting filler and consequently said excess layer is only locally applied at the holes area, forming a non-continuous layer at the back side of the skin.

This results in another drawback that it has to be tackled regarding the control of said excess of light transmitting filler which affects to the finishing of the vehicle interior part after connecting the carrier and the skin due to the fact that the back side of the skin is not continuous.

Other known solutions comprise the use of light transmitting fillers having a higher viscosity.

A high enough viscosity makes difficult to achieve a homogeneous and complete filling of the holes, which implies a risk of bubbles, voids, and non-homogeneously compact filling. It mainly has a negative impact on the lighting quality.

In addition, this kind of light transmitting fillers are usually thermoplastic. It means that they tend to melt under high temperatures losing its physical stability.

As the vehicle cabin can be exposed to high temperatures during its service life which can reach more than 120° C., even more those parts exposed to direct solar radiation, this kind of materials is not adequate because the loss of physical stability makes said materials flow, thus directly affecting the finishing quality of the skin and the lighting quality.

In view of the disadvantages mentioned above, the object of the invention is a skin for dressing backlit vehicle interior parts comprising a perforated opaque decorative layer and a light transmitting filler filling the holes in order to prevent unexpected materials from clogging the holes, wherein the holes are homogeneously and completely filled, wherein the light transmitting material is configured to the light can pass through it and it is flush with the front side of the perforated opaque decorative layer in order to allow a lighting quality and a finishing quality in both, the skin for dressing backlit vehicle interior parts as such, and the backlit vehicle interior part comprising said skin, according to a cost effective manufacturing method in terms of cycle time and tools and able to keep the lighting quality and the finishing quality throughout its service life thanks to the chemical and physical stability of the light transmitting filler.

SUMMARY

The present invention according to a first aspect relates to a skin for dressing backlit vehicle interior parts comprising an opaque decorative layer having several through holes and a light transmitting filler filling said holes.

Due to the fact that the holes are filled by a light transmitting filler, unexpected materials such as dust or other materials clogging the holes is avoided.

Thus, the light can pass through the holes keeping as much light emission intensity as possible, and preserving or even improving the light emission quality through the holes.

According to the invention the light transmitting filler has a dynamic viscosity between 10.000 cPs and 30.000 cPs at a temperature between 110 and 170° C. when first heated up and melted.

On the one hand, said dynamic viscosity is low enough to allow an homogeneous and complete filling of the holes avoiding bubbles or voids and to allow an homogeneously compact filling.

In this way, it is possible to obtain an homogeneous light at the light exit part and to achieve an effective use of the light emitted by the lighting device, both effects resulting in a lighting quality.

On the other hand, said dynamic viscosity is high enough to minimize filler leakages when it is applied to the back side of the opaque decorative layer and consequently to minimize the soiling of the front side thereof.

In this way, it is possible to obtain a quality finishing of the opaque decorative layer and consequently of the final skin obtained.

Due to the fact the light transmitting filler comprises a reactive hotmelt adhesive once it is first heated and cured it becomes a physically and chemically stable final part.

Particularly, the reactive hotmelt adhesive as thermoplastic, allows that a portion of the adhesive being flush with the front side of the opaque decorative layer solidifies when it contacts with a cool surface.

This allows stabilizing the light exit part of the adhesive and creating a solid surface barrier which avoids the overflowing of the adhesive and consequently the soiling of the front side of the opaque decorative layer.

Thus, the adhesive keeps in place and is flush with the front side of the opaque decorative layer and gets its final exterior shape quickly.

Said partial stability of the adhesive at the surface being flush with the front side of the opaque decorative layer allows removing the skin from the light transmitting filler application tool before the adhesive totally cures.

In this way, the hole filling cycle time is shortened without using additional materials such as protective sheets covering the front side of the opaque decorative layer.

On the other hand, the reactive hotmelt adhesive as reactive, once the adhesive is cured allows standing the high temperatures that can be reached in the vehicle cabin without losing its integrity. It allows the adhesive keeps its quality, both lighting quality and finishing quality, throughout its service life.

As a consequence of the formation of the base layer extended over the back side of the opaque decorative layer, it is ensured enough extra light transmitting filler to completely fill the holes.

This, in combination with the dynamic viscosity of the light transmitting filler which ensures an homogeneous filling, favors the quality of the light obtained.

Although the base layer ensures the complete filling of the holes impacting positively in the lighting quality, it is very important to control the configuration of said base layer due to the fact that it is not extended continuously over the whole back side of the decorative opaque layer.

It means that after connecting the skin with the carrier in order to form the final vehicle interior part, said non-continuous base layer can cause visible marks which impact negatively in the finishing quality of the final vehicle part.

Thus, the small thickness of the base layer of the present invention, being less than 0.25 mm minimizes the formation of marks after laminating the skin with the carrier forming the final vehicle interior part. In this way the finishing quality of the final vehicle part is ensured.

In addition, the base layer comprises a transition portion surrounding the central portion, having a width of at least 5 mm wherein its thickness progressively decreases from a thickness less than 0.25 mm, the thickness of the central portion, to a thickness of 0 mm at the periphery of the base layer, configuring in this way a soft transition between the base layer and the back side of the skin.

This also helps to minimize the risk of marks in the front side of the final vehicle part after connecting the skin with the carrier by an adhesive to form the final vehicle interior part. In this way the finishing quality of the final vehicle part is also ensured.

According to a second and a third aspect, the present invention relates to a method and an installation for manufacturing a skin for dressing backlit vehicle interior parts.

The flat bearing surface having a temperature less than 40° C. for laying the opaque decorative layer is configured for both, bearing the opaque decorative layer and the dosing head pressure and efforts, and being in contact with the front side of the opaque decorative layer. This particular configuration allows that the light transmitting filler, being a reactive hotmelt adhesive, cools and solidifies upon it comes into contact with the flat bearing surface.

Thus, the light exit part is flush with the front side of the opaque decorative layer and it becomes stable immediately upon mutual contact with the flat bearing surface, and consequently said light exit part gets its final shape and texture.

In addition, the immediate solidification of the light exit part allows creating a stable and solid surface barrier which prevents the light transmitting filler overflows in the front side of the opaque decorative layer without using additional protective parts.

It helps to ensure the finishing quality and to save cycle time and costs.

On the other hand, the stable and solid surface barrier allows a safe extraction of the skin from the light transmitting filler application tool before the light transmitting filler cures resulting in a more efficient process in terms of cycle time and cost.

In addition, due to the fact that the front surface of the opaque decorative layer is in contact with the flat bearing surface having a temperature less than 40° C. during the light transmitting filler application, and taking into account that the light transmitting filler has a high temperature, it allows keeping the front side of the opaque decorative layer cold enough to prevent visible damages. Thus, the finishing quality is ensured as well.

According to the invention, the light transmitting filler is applied on the back side of the opaque decorative layer in order to fill the holes by means of a movable dosing head configured to slidably move over said back side.

Particularly, the movable dosing head comprises a pressure part configured to exert a first pressure $P_1$ on the opaque decorative layer, being higher than 0.3 kg/cm$^2$, and a dossing nozzle configured to apply the light transmitting filler at a temperature between 110 and 170° C. and at a second pressure $P_2$, being 0 at a periphery of the transition portion and being between the range of 0.25 and 1 kg/cm$^2$ through the length of the base layer (3.1), wherein the second pressure $P_2$ being less than the first pressure $P_1$.

The pressure exerted by the pressure part ensures keeping the pressure of the opaque decorative layer against the flat bearing surface during the light transmitting filler application.

This is very important to achieve that the light transmitting filler, and particularly the light exit part formed at the outmost portion of the projections, is flush with the front side of the decorative opaque layer.

The pressure exerted by the dosing nozzle allows controlling the amount of light transmitting filler applied in every hole in order to configure a base layer comprising enough excess light transmitting filler at the back side to ensure a complete filling of the holes, compacting said base layer, and configuring a particular shape of this base layer.

On the one hand, the particular combination of pressures exerted by the pressure part and the dosing nozzle allows ensuring a complete filling of the holes, and compacting the base layer. This avoids the presence of bubbles or voids along the projections filling the holes. Both together allow creating a light transmitting filler continuity and homogeneity inside every hole. Thus, the light passing through the holes keeps as much light emission intensity as possible, and preserves or even improves the light emission quality through the holes.

As it has been described above, the base layer comprises a transition portion surrounding a central portion. Said transition portion comprising in turn, a first part formed by two portions, a front portion and a back portion, each of them continuously extended in a direction essentially perpendicular to the direction "S" of motion of the movable dosing head and a second part formed by two lateral portions, each of them continuously extended in the direction "S".

The particular combination of pressures exerted by the pressure part and the dosing nozzle allows creating the first part of the transition portion.

The geometry of the pressure part comprising an open internal cavity having a particular shape allows configuring the second part of the transition portion as the dosing head moves forward in the direction "S" of motion.

Said transition portion as a whole, allows minimizing visible marks in the final vehicle part.

On the other hand, the combination of laying the opaque decorative layer on a cool flat bearing surface with the pressure exerted on the opaque decorative layer by the pressure part of the dosing head, allows the light transmitting filler being flush with the front side of the opaque decorative layer before the light transmitting filler cures.

Particularly, said combination allows defining a controlled hole surface, shape and texture, being flush with the front side of the opaque decorative layer, and allows defining a perfect hole outline resulting in a clean light exit and in this way keeping the lighting quality of the light obtained.

According to a fourth aspect the present invention relates to a backlit vehicle interior part comprising the skin above described.

DESCRIPTION OF THE FIGURES

The present descriptive memory is completed by a set of figures illustrating the preferred embodiment and in no way limiting the invention.

FIGS. 6, 7, 8 and 9 show a schematic representation of the installation for manufacturing the skin for dressing backlit vehicle interior parts.

Particularly

DETAILED DESCRIPTION

Figure 1:
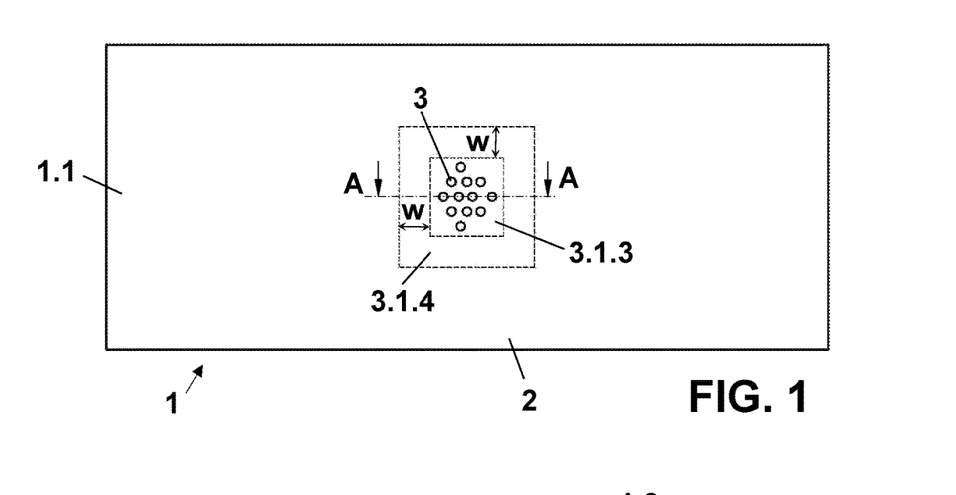
FIG. 1 shows a top view of the skin for dressing backlit vehicle interior parts from its front side.
Figure 2:
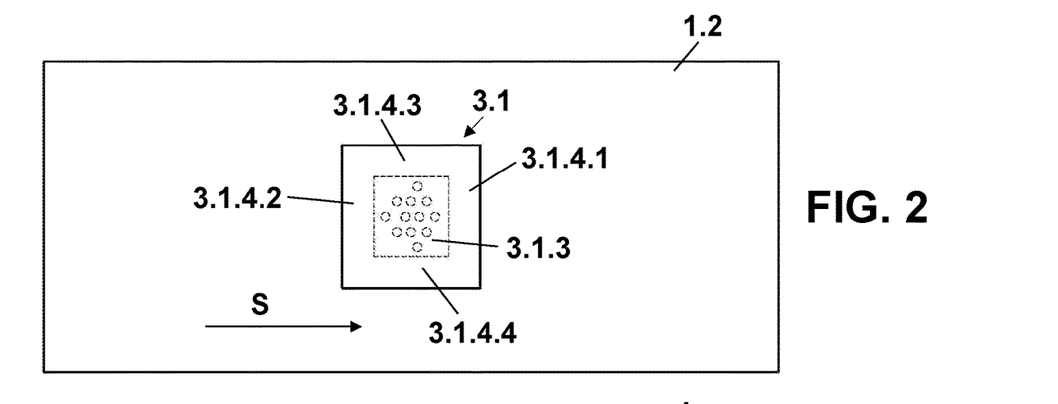
FIG. 2 shows a top view of the skin for dressing backlit vehicle interior parts from its back side.

FIG. 1 shows the front side (1.1) of a skin (1) for dressing backlit vehicle interior parts (10) and FIG. 2 shows the back side (1.2) thereof. Particularly, the skin (1) comprises and an opaque decorative layer (2) and a light transmitting filler (3).

Figure 3:
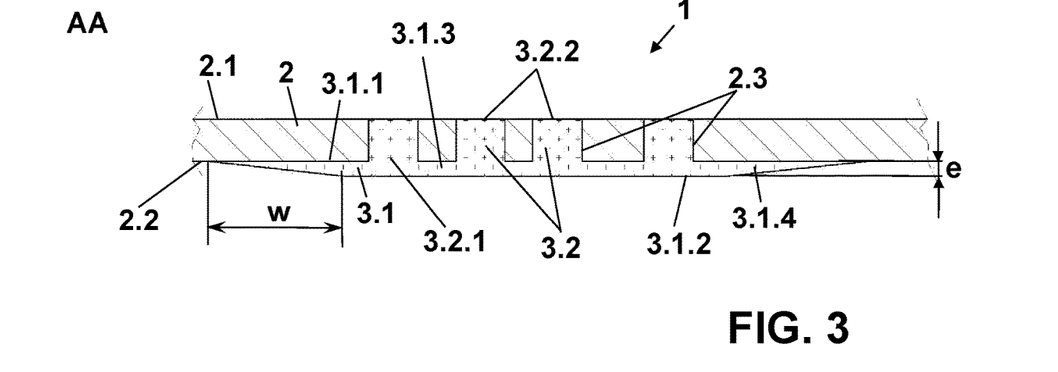
FIG. 3 shows an enlarged cross-sectional view of the skin for dressing backlit vehicle interior parts according to the plane AA represented in the FIG. 1.

As shows FIG. 3, the opaque decorative layer (2) has a front side (2.1), a back side (2.2) and several through holes (2.3) extended from the back side (2.2) to the front side (2.1)

and having a diameter less than 2.5 mm. More preferably the diameter is between 0.6 and 2 mm.

Preferably, the opaque decorative layer (2) is a flexible layer such as leather or synthetic leather and its thickness is between 0.6 and 1.5 mm. More preferably the thickness is between 0.75 and 1.25 mm.

The through holes (2.3) are configured to the light can pass through them. They can form a decorative or signaling design, for example it can be configured for indicating the position of a capacitive switch or for indicating a particular state of the vehicle.

Figure 4:
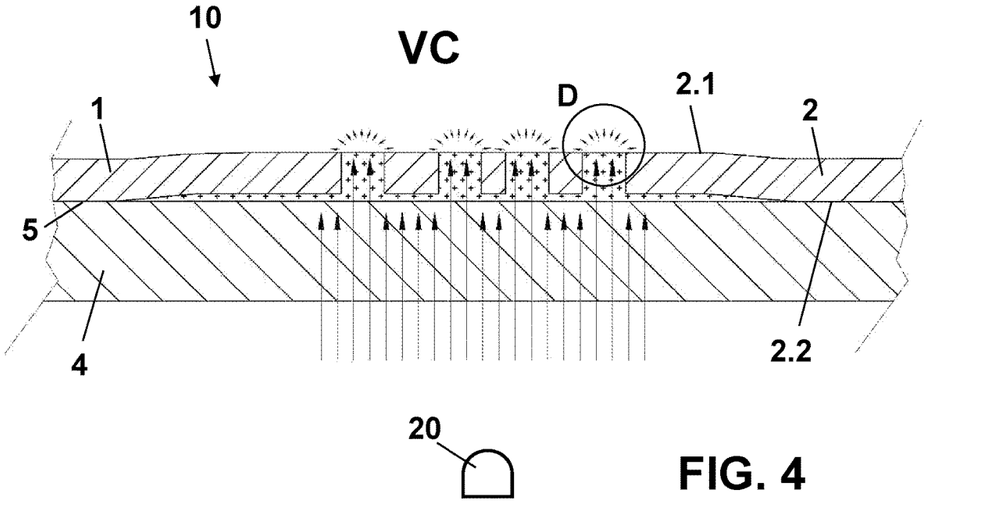
FIG. 4 shows a cross-sectional view of the backlit vehicle interior part comprising a skin according to the invention.

The light transmitting filler (3) completely fills the through holes (2.3) of the opaque decorative layer (2) and allows the light provided by a lighting device (20), schematically represented in FIG. 4, pass through it in order to illuminate the vehicle cabin (VC). The light transmitting filler (3) can be transparent or translucent.

In the case of being translucent, the light transmitting filler (3) can be colored. The color can be chosen according to the color of the decorative opaque layer (2) in order to improve the visual continuity between the perforated areas and the non-perforated areas thereof in such a way that the through holes (2.3) are not visually perceptible when the lighting device (20) is switched off, or in order to create an intentional color contrast providing a decorative effect.

In addition, the colored light transmitting filler (3) can provide a diffusing lighting effect in order to improve the light homogeneity.

The light transmitting filler (3) comprises a reactive hotmelt adhesive having a dynamic viscosity between 10.000 cPs and 30.000 cPs at a temperature between 110 and 170° C. Particularly, it can be a reactive polyurethane-based hotmelt adhesive (PUR) or a reactive polyolefin-based hotmelt adhesive (POR).

The light transmitting filler (3) comprises a base layer (3.1) and several projections (3.2) protruding from the base layer (3.1) and completely filling the through holes (2.3).

The base layer (3.1) extends over the back side (2.2) of the opaque decorative layer (2) and it has a front side (3.1.1) being in contact with the decorative opaque layer (2) and a back side (3.1.2) opposite to the front side (3.1.1), and it comprises a central portion (3.1.3) where the projections (3.2) protrude and a transition portion (3.1.4) surrounding the central portion (3.1.3) having a width "w".

Particularly, as FIGS. 1 and 2 show, the transition portion (3.1.4) comprises in turn, a first part formed by two portions, a front portion (3.1.4.1) and a back portion (3.1.4.2), each of them continuously extended in a direction essentially perpendicular to the direction "S" of motion of the dosing head (8) described below, and a second part formed by two lateral portions (3.1.4.3, 3.1.4.4), each of them continuously extended in said direction "S".

The central portion (3.1.3) has a continuous thickness "e" of less than 0.25 mm, and more preferably less than 0.2 mm. The transition portion (3.1.4) has a width "w" of at least 5 mm wherein its thickness progressively decreases from a thickness less than 0.25 mm, the thickness of the central portion (3.1.3), to a thickness of 0 mm at the periphery of the base layer (3.1). According to a more preferably embodiment the width "w" is around 10 mm.

The projections (3.2) comprise a bottom end (3.2.1) connecting the projection (3.2) to the base layer (3.1) and a light exit part (3.2.2), opposite to the bottom end (3.2.1), being flush with the front side (2.1) of the opaque decorative layer (2), where the light exits from the backlit vehicle interior part (10) to the vehicle cabin (VC).

Figure 5:
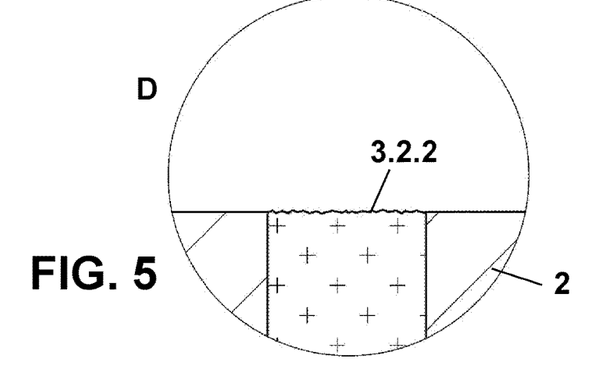
FIG. 5 shows a detail view of the skin for dressing backlit vehicle interior parts according to the detail D represented in the FIG. 4.

According to an embodiment represented in the FIG. 5, the light exit part (3.2.2) has a predefined textured surface configured intentionally in order to diffuse the light passing through said light exit part (3.2.2) and consequently improving the homogeneity of the light obtained at the vehicle cabin (VC).

FIG. 4 shows a backlit vehicle interior part (10) comprising the skin above described. Particularly, it comprises a light transmitting carrier (4) connected by an adhesive (5) to a skin (1) according to the invention.

Preferably, the light transmitting carrier (4) and the skin (1) are connected by laminating.

As FIG. 4 shows the soft transition provided by the transition portion (3.1.4) minimizes the risk of visible perceptible marks on the front side of the backlit vehicle interior part (10).

FIGS. 6, 7, 8 and 9 show a schematic representation of an installation for manufacturing a skin (1) for dressing backlit vehicle interior parts (10) comprising the technical features described above, as well as the method for manufacturing said skin (1).

Particularly the method comprises the steps a) to e) described below.

a) Providing an opaque decorative layer (2) having a front side (2.1) and a back side (2.2), and having several through holes (2.3) extended from the back side (2.2) to the front side (2.1) wherein the through holes (2.3) have a diameter less than 2.5 mm. More preferably the diameter is between 0.6 and 2 mm.

Figure 8:
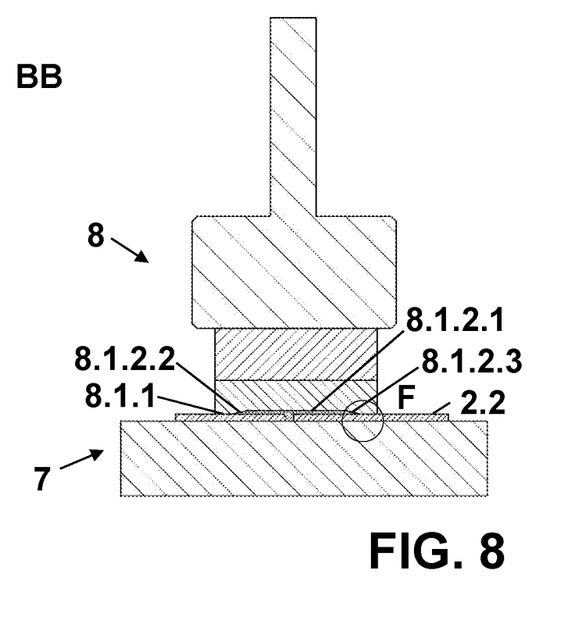
FIG. 8 shows a cross-sectional view of the dosing head according to the plane BB represented in the FIG. 6

The opaque decorative layer (2) is previously perforated for example by perforating means such as die punching not represented since this aspect is not relevant to the invention.

b) Laying the opaque decorative layer (2) on a bearing means (7) comprising:

a flat bearing surface (7.1) being in contact with the front side (2.1) of the opaque decorative layer (2), and a cooling means (7.2) for keeping the flat bearing surface (7.1) at a temperature less than 40° C., and more preferably less than 30° C.

c) Applying a light transmitting filler (3) being a reactive hotmelt adhesive having a dynamic viscosity between 10.000 cPs and 30.000 cPs during its application at a temperature between 110 and 170° C. on the back side (2.2) of the opaque decorative layer (2) by means of a dosing head (8) comprising a pressure part (8.1) and a dosing nozzle (8.2) and being slidably movable in a direction "S" corresponding to the direction of motion of the dosing nozzle (8.2), wherein in order to configure a base layer (3.1) having a central portion (3.1.3) and a transition portion (3.1.4) surrounding the central portion (3.1.3) and several projections (3.2) protruding from the central portion (3.1.3) and completely filling the through holes (2.3):

the pressure part (8.1) exerts a first pressure $P_1$ on the opaque decorative layer (2), being higher than 0.3 kg/cm². Preferably said first pressure $P_1$ being less than 4 kg/cm².

the pressure part (8.1) comprises a pressure surface (8.1.1) configured to be in contact with the back side (2.2) of the opaque decorative layer (2) and to exert the first pressure $P_1$, and an open internal cavity (8.1.2) configured to provide the shape of the light transmitting filler (3), particularly the shape of the second part of the transition portion (3.1.4) and the central portion (3.1.3) as FIG. 8 shows, the dossing nozzle (8.2) applies the light transmitting filler (3) at a temperature between 110 and 170° C. and at a second pressure $P_2$, being 0 at a periphery of the transition portion (3.1.4) and being between the range of 0.25 and 1 kg/cm² through the length of the base layer (3.1), the second pressure $P_2$ being less than the first pressure $P_1$.

d) cooling a part of the light transmitting filler (3) upon contacting the flat bearing surface (7.1) being at a temperature less than 40° C. and creating a solid surface barrier being flush with the front side (2.1) of the opaque decorative layer (2), e) cooling the remaining part of the light transmitting filler (3) and curing the whole light transmitting filler (3).

According to an embodiment the light transmitting filler (3) can be cured under the environmental moisture present during the method of manufacturing or under moisture added during the method to accelerate said curing.

According to an embodiment, the method further comprises a step of embossing a part of the light transmitting filler (3) being flush with the front side (2.1) of the opaque decorative layer (2) and being in contact with a predefined textured surface of the flat bearing surface (7.1), namely the light exit part (3.2.2) above defined.

Figure 6:
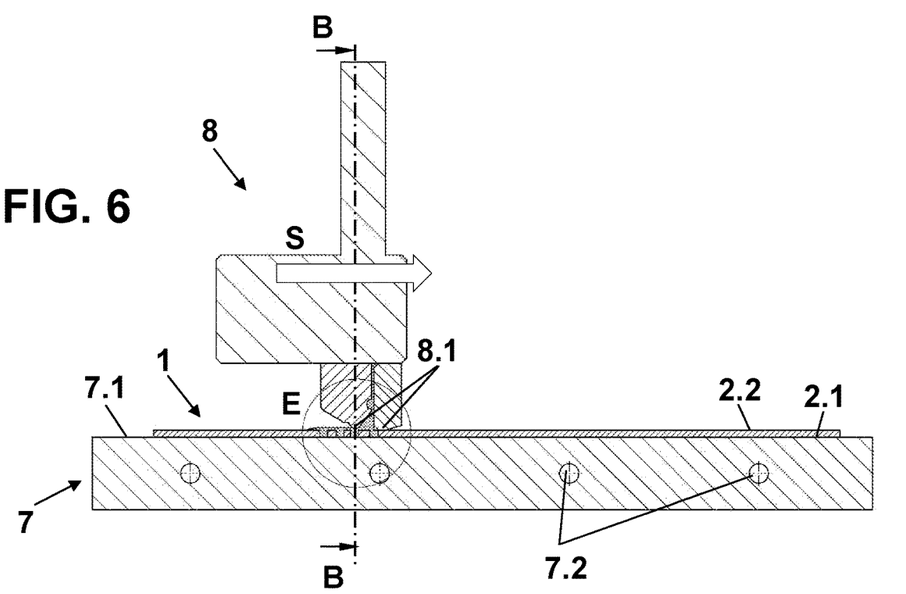
FIG. 6 shows a schematic representation of the bearing means and the dosing head.

According to the invention, the installation for manufacturing a skin (1) for dressing backlit vehicle interior parts (10) comprising the technical features described above comprises:

i) Bearing means (7) for supporting an opaque decorative layer (2) having a front side (2.1) and a back side (2.2) and having several through holes (2.3) extended from the back side (2.2) to the front side (2.1), wherein the through holes (2.3) have a diameter less than 2.5 mm, the bearing means (7) represented in the FIG. 6 comprising:

a flat bearing surface (7.1) configured to be in contact with the front side (2.1) of the opaque decorative layer (2), and cooling means (7.2) for keeping the flat bearing surface (7.1) at a temperature less than 40° C., and more preferably less than 30° C.

According to an embodiment the flat bearing surface (7.1) comprises a predefined textured surface configured to emboss a part of the light transmitting filler (3) being in contact with it, namely the light exit part (3.2.2) above defined.

This configuration is particularly advantageous due to the fact that the light exit part (3.2.2) gets the predefined textured surface directly during the application of the light transmitting filler (3) without any special additional step being required for configuring said predefined textured surface.

ii) a movable dosing head (8), configured to slidably move over the back side (2.2) of the opaque decorative layer (2) in a direction "S", for applying a light transmitting filler (3) to the back side (2.2) of the opaque decorative layer (2) in order to configure a base layer (3.1) having a central portion (3.1.3) and a transition portion (3.1.4) surrounding the central portion (3.1.3) and several projections (3.2) protruding from the central portion (3.1.3) and completely filling the through holes (2.3).

Particularly, as it has been mentioned above, the transition portion (3.1.4) comprises in turn, a first part and a second part according to the particular features described above.

Figure 7:
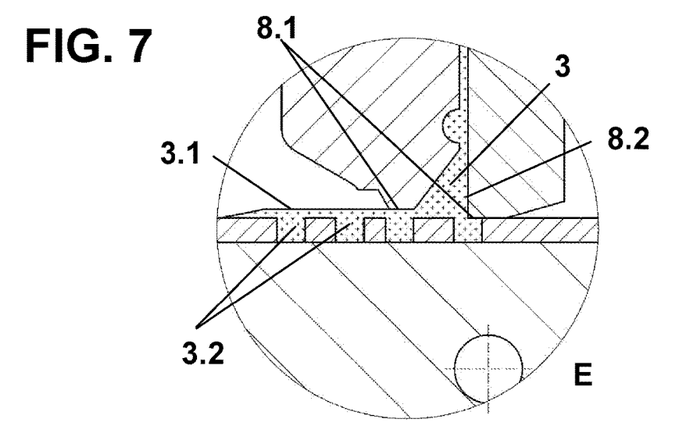
FIG. 7 shows a detail E of the dosing head represented in FIG. 6.

As FIGS. 6 and 7 show, the movable dosing head (8) comprises a pressure part (8.1) and a dossing nozzle (8.2).

The pressure part (8.1) is configured to exert a first pressure $P_1$ on the opaque decorative layer (2), being higher than 0.3 kg/cm², more preferably being less than 4 kg/cm².

Figure 9:
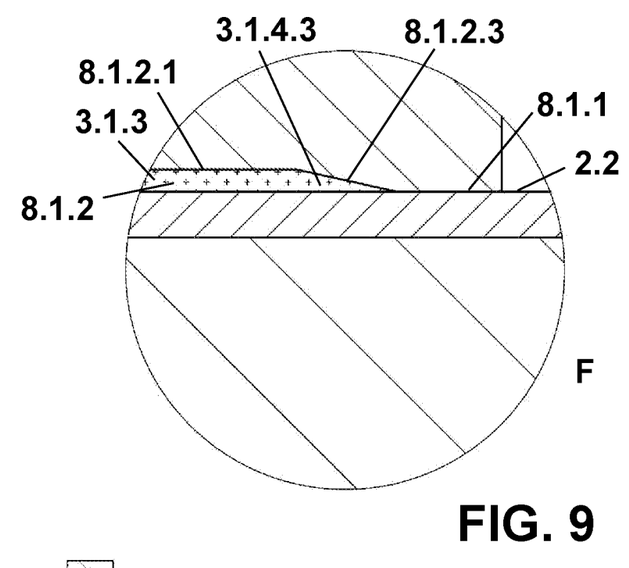
FIG. 9 shows a detail F of the pressure part of dosing head represented in FIG. 8.

In addition, as FIGS. 8 and 9 show, and as it has been described above, the pressure part (8.1) comprises a pressure surface (8.1.1) configured to be in contact with the back side (2.2) of the opaque decorative layer (2) and to exert the first pressure $P_1$, and an open internal cavity (8.1.2) configured to provide the shape of the light transmitting filler (3), particularly the shape of the second part of the transition portion (3.1.4) and the central portion (3.1.3).

Particularly, the open internal cavity (8.1.2) comprises a first portion having a constant thickness and being defined by a main top wall (8.1.2.1) and two lateral portions having a progressively decreasing thickness and being defined by two beveled walls (8.1.2.2, 8.1.2.3) which connect the main wall (8.1.2.1) to the pressure surface (8.1.1).

The dossing nozzle (8.2) is configured to apply the light transmitting filler (3) at a temperature between 110 and 170° C. and at a second pressure $P_2$, being 0 at a periphery of the transition portion (3.1.4) and being between the range of 0.25 and 1 kg/cm² through the length of the base layer (3.1), the second pressure $P_2$ being less than the first pressure $P_1$.

As mentioned above, the light transmitting filler (3) is a reactive hotmelt adhesive having a dynamic viscosity between 10.000 cPs and 30.000 cPs at a temperature between 110 and 170° C., that is, at the application temperature of the light transmitting filler (3).

The invention claimed is:

1. A skin (1) for covering backlit vehicle interior parts (10) comprising:
   an opaque decorative layer (2) having:
      a front side (2.1) and a back side (2.2)
      several through holes (2.3), each one having a diameter less than 2.5 mm,
   a light transmitting filler (3) comprising a reactive hotmelt adhesive, the light transmitting filler having:
      a base layer (3.1) extended over the back side (2.2) of the opaque decorative layer (2) and comprising a central portion (3.1.3) and a transition portion (3.1.4) surrounding the central portion (3.1.3),
      several projections (3.2) protruding from the central portion of the base layer (3.1) and completely filling the through holes (2.3), each projection comprising:
         a bottom end (3.2.1) connecting the projection (3.2) to the base layer (3.1) and
         a light exit part (3.2.2) being flush with the front side (2.1) of the opaque decorative layer (2),
   wherein the reactive hotmelt adhesive has a dynamic viscosity between 10,000 and 30,000 cPs at a temperature between 110 and 170° C.,
   wherein the central portion (3.1.3) has a constant thickness of less than 0.25 mm, and the transition portion (3.1.4) has a thickness that progressively decreases from the thickness of the central portion (3.1.3) to a thickness of 0 mm at a periphery of the base layer (3.1) and a width measured between the central portion (3.1.3) and the periphery of the base layer (3.1) of at least 5 mm.

2. The skin (1) according to claim 1, wherein the light exit part (3.2.2) has a predefined textured surface.

3. The skin of claim 2, wherein the predefined textured surface of the light exit part (3.2.2) is configured to diffuse light passing through the light exit part (3.2.2).

4. The skin (1) according to claim 1, wherein the light transmitting filler (3) is colored or transparent.

5. The skin of claim 4, wherein the light transmitting filler (3) is colored, wherein a color of the light transmitting filler (3) is chosen according to a color of the decorative opaque layer (2) such that the through holes (2.3) are not visually perceptible when not being backlit or is chosen in order to provide an intentional color contrast with the decorative opaque layer (2), and/or in order to provide a diffusing lighting effect.

6. The skin of claim 1, wherein the continuous thickness of the central portion (3.1.3) is less than 0.2 mm and the width of the transition portion (3.1.4) is about 10 mm.

7. The skin of claim 1, wherein the opaque decorative layer (2) is a flexible layer comprising leather or synthetic leather.

8. The skin of claim 1, wherein the reactive hotmelt adhesive is a reactive polyurethane-based hotmelt adhesive or a reactive polyolefin-based hotmelt adhesive.

9. A backlit vehicle interior part (10) comprising:
the skin (1) according to claim 1, and
a light transmitting carrier (4),
wherein the skin (1) is connected to the light transmitting carrier (4) with an adhesive (5).

10. A method for manufacturing the skin (1) for covering backlit vehicle interior parts (10) according to claim 1, wherein the method comprises the following steps:
a) providing the opaque decorative layer,
b) laying the opaque decorative layer (2) on a bearing means (7) comprising:
a flat bearing surface (7.1) being in contact with the front side (2.1) of the opaque decorative layer (2), and
a cooling means (7.2) for keeping the flat bearing surface (7.1) at a temperature less than 40° C.,
c) applying the light transmitting filler (3) comprising the reactive hotmelt adhesive having-a the dynamic viscosity between 10,000 and 30,000 cPs during its application at the temperature between 100 and 170° C. on the back side (2.2) of the opaque decorative layer (2) and completely filling the through holes (2.3) by means of a dosing head (8) comprising a pressure part (8.1) and a dosing nozzle (8.2) and being slidably movable in a direction S,
wherein the pressure part (8.1) comprises a pressure surface (8.1.1) positioned in contact with the back side (2.2) of the opaque decorative layer (2) and exerts a first pressure P1 on the opaque decorative layer (2), higher than 0.3 kg/cm$^2$, and an open internal cavityto provide a shape for the base layer of the light transmitting filler (3), and
the dosing nozzle (8.2) applies the light transmitting filler (3) at the application temperature and at a second pressure $P_2$, the second pressure $P_2$ being less than the first pressure $P_1$,
d) cooling the light transmitting filler (3) upon contacting the flat bearing surface (7.1) being at a temperature less than 40° C. and creating a solid surface barrier of the light exit part being flush with the front side (2.1) of the opaque decorative layer (2),
e) cooling the remaining part of the light transmitting filler (3) and curing the whole light transmitting filler (3).

11. The method of claim 10, wherein the second pressure $P_2$ is 0 kg/cm$^2$ at the periphery of the base layer (3.1) and is within a range of 0.25 to 1 kg/cm$^2$ through a length of the base layer (3.1).

12. The method according to claim 10, wherein $P_1$ is less than 4 kg/cm$^2$.

13. The method according to claim 10, wherein the method further comprises a step of embossing the light exit part (3.2.2) of the light transmitting filler (3) being flush with the front side (2.1) of the opaque decorative layer (2) by being in contact with a predefined textured surface of the flat bearing surface (7.1).

14. The method of claim 10, wherein the open internal cavity (8.1.2) comprises a first portion having a constant depth and being defined by a main top wall (8.1.2.1) and two lateral portions having a progressively decreasing depth and being defined by two beveled walls (8.1.2.2, 8.1.2.3), which connect the main wall (8.1.2.1) to the pressure surface (8.1.1).

15. The method of claim 10, wherein the light transmitting filler (3) is colored or transparent.

16. An apparatus for manufacturing the skin (1) for covering backlit vehicle interior parts (10) according to claim 1, wherein the apparatus comprises:
i) a bearing means (7) for supporting the opaque decorative layer (2), the bearing means comprising:
a flat bearing surface (7.1) configured to be in contact with the front side (2.1) of the opaque decorative layer (2), and
a cooling means (7.2) for keeping the flat bearing surface (7.1) at a temperature less than 40° C.,
ii) a movable dosing head (8), configured to slidably move over the back side (2.2) of the opaque decorative layer (2) in a direction S, and for applying the light transmitting filler (3) to the back side (2.2) of the opaque decorative layer (2) in order to form the base layer and completely filling the through holes (2.3) in order to form the several projections with the light exit part (3.2.2) of each projection being in contact with the flat bearing surface (7.1),
wherein the movable dosing head comprises:
a pressure part (8.1) comprising a pressure surface (8.1.1) positioned in contact with the back side (2.2) of the opaque decorative layer (2) and for exerting a first pressure P1 on the opaque decorative layer (2) higher than 0.3 kg/cm$^2$, and an open internal cavity configured to provide a shape for the base layer of the light transmitting filler (3), and
a dosing nozzle (8.2) for applying the light transmitting filler (3) at an application temperature between 110 and 170° C. and at a second pressure $P_2$, the second pressure $P_2$ being less than the first pressure $P_{1T}$.

17. The apparatus of claim 16, wherein the second pressure $P_2$ is 0 kg/cm$^2$ at the periphery of the base layer (3.1) and is within a range of 0.25 to 1 kg/cm$^2$ through a length of the base layer (3.1).

18. The apparatus according to claim 16, wherein the first pressure P1 is less than 4 kg/cm$^2$.

19. The apparatus according to claim 16, wherein the bearing surface (7.1) has a predefined textured surface configured to form a predefined textured surface of the light exit part (3.2.2).

20. The apparatus according to claim 16, wherein the open internal cavity (8.1.2) comprises a first portion having a constant depth and being defined by a main top wall (8.1.2.1) and two lateral portions having a progressively decreasing depth and being defined by two beveled walls (8.1.2.2, 8.1.2.3), which connect the main wall (8.1.2.1) to the pressure surface (8.1.1).

* * * * *

UNITED STATES PATENT AND TRADEMARK OFFICE
CERTIFICATE OF CORRECTION

PATENT NO. : 12,122,132 B2
APPLICATION NO. : 17/893726
DATED : October 22, 2024
INVENTOR(S) : Marcos et al.

It is certified that error appears in the above-identified patent and that said Letters Patent is hereby corrected as shown below:

In the Claims

In Column 10, Line 26, in Claim 1, after "(2.2)", insert --,--

In Column 10, Line 39, in Claim 1, after "(3.1)", insert --,--

In Column 11, Line 25, in Claim 10, delete "40° C.," and insert --40 °C.,-- therefor In Column 11, Line 27, in Claim 10, delete "having-a" and insert --having-- therefor In Column 11, Line 38, in Claim 10, delete "P1" and insert --$P_1$-- therefor In Column 11, Line 38, in Claim 10, delete "(2)," and insert --(2)-- therefor In Column 11, Line 39, in Claim 10, delete "cavityto" and insert --cavity to-- therefor In Column 12, Line 8, in Claim 14, delete "(8.1.2.2, 8. 1.2.3)," and insert --(8.1.2.2, 8.1.2.3),-- therefor In Column 12, Line 36, in Claim 16, delete "P1" and insert --$P_1$-- therefor In Column 12, Line 43, in Claim 16, delete "$P_{1T}$." and insert --$P_1$.-- therefor In Column 12, Line 49, in Claim 18, delete "P1" and insert --$P_1$-- therefor Signed and Sealed this
Twelfth Day of August, 2025

Coke Morgan Stewart
*Acting Director of the United States Patent and Trademark Office*